United States Patent
Guo et al.

(10) Patent No.: US 9,743,056 B2
(45) Date of Patent: Aug. 22, 2017

(54) METHOD AND DEVICE FOR PROCESSING A PROJECTION IMAGE, AND PROJECTION DISPLAY SYSTEM

(71) Applicant: Hisense Co., Ltd., Qingdao (CN)

(72) Inventors: Dabo Guo, Qingdao (CN); Kunming Chen, Qingdao (CN); Jichen Xiao, Qingdao (CN)

(73) Assignees: HISENSE CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 15/393,711

(22) Filed: Dec. 29, 2016

(65) Prior Publication Data
US 2017/0111622 A1   Apr. 20, 2017

(30) Foreign Application Priority Data
Jun. 20, 2016   (CN) .......................... 2016 1 0447448

(51) Int. Cl.
H04N 9/31   (2006.01)
(52) U.S. Cl.
CPC ................................ *H04N 9/3188* (2013.01)

(58) Field of Classification Search
CPC .. H04N 9/3188; H04N 9/3179; H04N 7/0117; H04N 7/0127; G09G 2340/0407; G09G 2340/0457
USPC .......... 348/739, 744–747, 441; 345/613, 660
See application file for complete search history.

(56) References Cited

U.S. PATENT DOCUMENTS

| | | | | |
|---|---|---|---|---|
| 5,959,702 A | * | 9/1999 | Goodman | ............ H04N 9/3129 348/744 |
| 2016/0112689 A1 | * | 4/2016 | Okamoto | ............. H04N 9/3147 348/745 |

\* cited by examiner

*Primary Examiner* — Sherrie Hsia
(74) *Attorney, Agent, or Firm* — Harness, Dickey & Pierce, P.L.C.

(57) ABSTRACT

Embodiments of this disclosure disclose a method for processing a projection image, including: obtaining an image to be projected, with a first resolution; adjusting the resolution of the image to be projected, according to a second resolution supported by a projection display device, to obtain a first image with a third resolution, number of pixels in the row direction of an image with the third resolution is N times number of pixels in the row direction of an image with the second resolution, and number of pixels in the column direction of the image with the third resolution is M times number of pixels in the column direction of the image with the second resolution; dividing the first image into pixel blocks, integrating pixels in the pixel blocks, to obtain a second image and a third image; and projecting the second image and the third image alternately.

17 Claims, 6 Drawing Sheets

METHOD AND DEVICE FOR PROCESSING A PROJECTION IMAGE, AND PROJECTION DISPLAY SYSTEM

CROSS-REFERENCE TO RELATED APPLICATION

This application claims the benefit and priority of Chinese Patent Application No. 201610447448.7 filed Jun. 20, 2016. The entire disclosure of the above application is incorporated herein by reference.

FIELD

The present disclosure relates to the field of projections, and particularly to a method and device for processing a projection image, and a projection display system.

BACKGROUND

This section provides background information related to the present disclosure which is not necessarily prior art.

The resolution of an image represents the amount of information stored in the image, which is typically represented as the product of the number of pixels in the row direction, and the number of pixels in the column direction, of the image, i.e., the total number of pixels. If the resolution of the image is higher, then there will be a larger number of pixels in the image, and the image will be clear. For example, if the resolution of the image is 1920*1080, then there will be an amount of information of 2M pixels in the image, and if the resolution of the image is 3840*2160, then there will be an amount of information of 8M pixels in the image.

The resolution supported by a projection display device is an important index to evaluate the performance of the projection display device in that if the resolution supported by the projection display device is higher, then an image will be projected at a higher precision onto and displayed on a screen, there will be more information displayed thereon, and the projected and displayed image will be clearer. However an improvement to the resolution supported by the projection display device which is a hardware device may be restrained by a process of manufacturing the hardware device, so the resolution supported by the projection display device tends to be improved much more slowly than the resolution of the image. By way of example in which a projector with a Digital Light Processor (DSP) configured to perform digital light processing includes a Digital Micromirror Device (DMD) which is a crucial element, the resolution of the DLP projector is primarily determined by the resolution of the DMD, where a DLP projector typically includes a DMD chip, and the resolution of the existing DMD generally includes 800*600, 1024*768, 1280*720, 1920*1080, etc., all of which are lower than that of an existing high-resolution image, e.g., a common image with the resolution of 3840*2160. Accordingly the high-resolution image typically has to be projected and displayed while losing information of some pixel in the prior art, thus resulting in a loss of the image quality of the projection image.

In view of this, it is highly desirable to study and address the problem of how to overcome the drawback of losing information of some pixel in the high-resolution image being projected and displayed in the prior art by providing a technical solution to projecting and displaying a high-resolution image without losing any amount of information of original pixels in the high-resolution image.

SUMMARY

This section provides a general summary of the disclosure, and is not a comprehensive disclosure of its full scope or all of its features.

Embodiments of this disclosure provide a method and device for processing a projection image, and a projection display system so as to overcome the drawback of losing information of some pixel in a high-resolution image being projected and displayed in the prior art by providing a technical solution to projecting and displaying a high-resolution image without losing any amount of information of original pixels in the high-resolution image.

In an aspect, an embodiment of this disclosure provides a method for processing a projection image, the method including:

obtaining an image to be projected, with a first resolution;

adjusting the resolution of the image to be projected, according to a second resolution supported by a projection display device, to obtain a first image with a third resolution, wherein a number of pixels in a row direction of an image with the third resolution is N times a number of pixels in a row direction of an image with the second resolution, and a number of pixels in a column direction of the image with the third resolution is M times a number of pixels in a column direction of the image with the second resolution, wherein N and M are positive integers;

dividing the first image into pixel blocks respectively in a first pixel block dividing mode and a second pixel block dividing mode, and integrating pixels in the pixel blocks as a result of division, to obtain a second image and a third image with their resolutions being lower than or equal to the second resolution; and projecting the second image and the third image alternately.

In another aspect, an embodiment of this disclosure provides a device for processing a projection image, the device including:

at least one processor; and a memory communicatively connected with the at least one processor, configured to store at least one processor executable instruction to be executed by the at least one processor to cause the at least one processor to perform the operations of:

obtaining an image to be projected, with a first resolution;

adjusting the resolution of the image to be projected, according to a second resolution supported by a projection display device, to obtain a first image with a third resolution, wherein a number of pixels in a row direction of an image with the third resolution is N times a number of pixels in a row direction of an image with the second resolution, and a number of pixels in a column direction of the image with the third resolution is M times a number of pixels in a column direction of the image with the second resolution, wherein N and M are positive integers;

dividing the first image into pixel blocks respectively in a first pixel block dividing mode and a second pixel block dividing mode, and integrating pixels in the pixel blocks as a result of division, to obtain a second image and a third image with their resolutions being lower than or equal to the second resolution; and projecting the second image and the third image alternately.

In still another aspect, an embodiment of this disclosure provides a projection display system including a light source, a projection display device, the device for processing a projection image according to the embodiment above of this disclosure, a light beam angle varying device, and a lens, wherein the light beam angle varying device is arranged between the projection display device and the lens, and configured to be controlled by the projection image processing device to be deflected; and the light source provides the projection display device with illumination, and the projection display device projects the image which is output by the light beam angle varying device to the lens for imaging, so that the image is projected onto a projection medium, thus resulting in the projection image In the technical solutions according to the embodiments of this disclosure, firstly the resolution of the image to be projected is adjusted according to the resolution supported by the projection display device, and such a first image is obtained that the numbers of pixels thereof in the row direction and the column direction are integer multiples of the numbers of pixels in the row direction and the column direction of an image with the resolution supported by the projection display device respectively; then the first image is divided into pixel blocks, and the pixels in the pixel blocks are integrated into the second image and the third image with their resolutions being lower than or equal to the resolution supported by the projection display device; and next the second image and the third image are projected alternately. As can be apparent, if there is a high resolution of the image to be projected, then with the technical solution according to the embodiments of this disclosure, firstly the high-resolution image to be projected will be adjusted to the image with the resolution thereof being an integer multiple of the resolution supported by the projection display device, and then the pixels will be integrated into the two images with their resolutions being lower than or equal to the resolution supported by the projection display device, so that these two images can be projected alternately to thereby project and display the high-resolution image to be projected, without losing any amount of original information of the pixels thereof, thus overcoming the drawback in the prior art of losing the information of pixels in the high-resolution image being projected and displayed.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
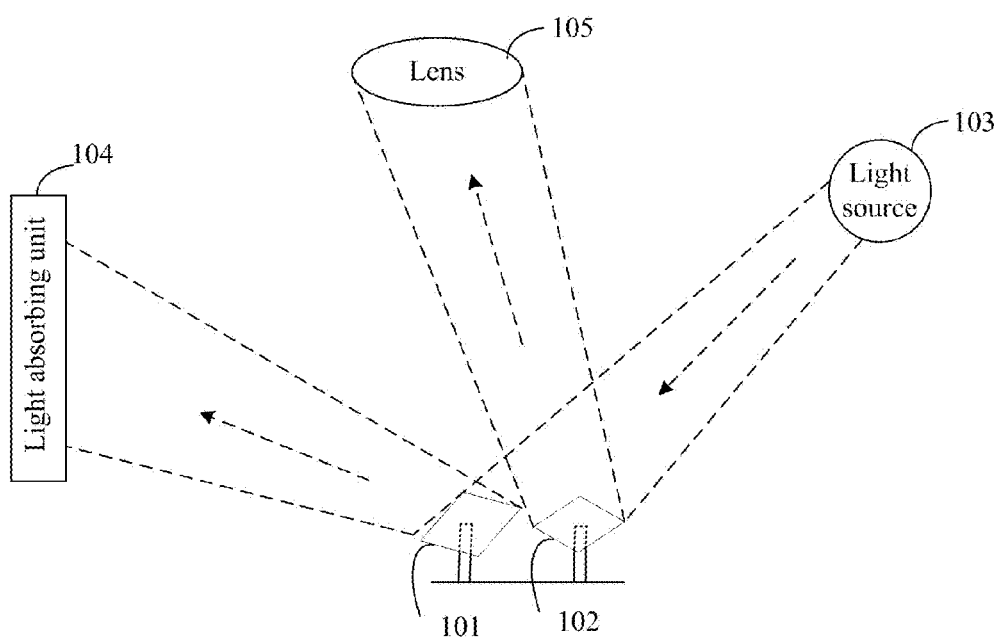
FIG. 1 is a schematic diagram of a micro-mirror on a DMD being deflected and projecting in the prior art.

Example embodiments will now be described more fully with reference to the accompanying drawings.

Generally the existing projection display device, e.g., the DLP projector, firstly processes digitally and then projects an image signal. In the DLP projector, a light source includes color wheels in the three primary colors, and the laser light source typically corresponds two color wheels including a fluorescence wheel and a color filter fluorescence, so that light beams in the three primary colors R, G, and B are output in sequence, and then incident onto the DMD, the continuous light is converted into gray scales using a synchronization signal, rendered in the three primary colors R, G, and B, and projected and imaged through a lens, where it is crucial to display the digital visual information as a result using the DMD, so the resolution supported by the DLP projector is primary determined by the resolution supported by the DMD.

Here the DMD is a bi-stable special light modulator including thousands of micro-mirrors (precise and micro reflection mirrors), which is manufactured by adding a rotating mechanism capable of adjusting a reflection face, to Complementary Metal Oxide Semiconductors (CMOSs) fabricated in a standard semiconductor process. Data are put into storage elements below the micro-mirrors so that the micro-mirrors are controlled electro-statically in a binary mode to be deflected, where the angles at which and the lengths of time for which respective micro-mirrors are deflected are controlled separately, to thereby guide the reflected light and modulate the grayscales, so that the image in respective units of areas are reflected by the respective micro-mirrors in the DMD, thus resulting in respective pixels in the projection image, where the respective pixels are integrated into the complete image; and the number of micro-mirrors represents the resolution supported by the DMD, which agrees with the resolution of the projection image, thus determining the clearness of the projected and displayed image which can be projected.

For example, given a DMD with the resolution of 1024*768, there are 1024*768 micro-mirrors on the DMD, each of which has two stable micro-mirror states including +X° and −X° (On/Off). As for the existing devices, the micro-mirror is deflected at +12° and −12°, where if the micro-mirror is deflected at +12°, then the reflected light ray will be incident onto the lens, and if the micro-mirror is deflected at −12°, then the reflected light ray will be not incident onto the lens. Each micro-mirror can be controlled to be switched on and off to accept and reject the light ray, so that the amount of light incident onto the lens is determined by the angles at which and the lengths of time for which the respective micro-mirrors are deflected. For example, if the angles at which the light rays are reflected by the micro-mirrors are controlled by a video signal modulated by the Digital Light Processor (DLP), then the video signal will be modulated into a pulse width modulated signal with a constant amplitude, so that the periods of time for which the light paths of the micro reflection mirrors are switched on and off are controlled by the width of the pulse in such a way that the light rays are incident onto the lens, resulting in the image at the grayscale levels with different brightness, so that the image is displayed in real time.

FIG. 1 illustrates a schematic diagram of light rays being transmitted while two micro-mirrors on a DMD are being deflected differently in the prior art. As illustrated in FIG. 1, the micro-mirror 101 and the micro-mirror 102 are deflected at different angles, so that the micro-mirror 101 reflects light emitted by a light source 103 onto a light absorbing unit 104, and the micro-mirror 102 reflects the light emitted by the light source 103 onto a lens 105 at the angle where it is deflected.

The resolution supported by the DMD which is a hardware device is so restrained by a process of manufacturing the DMD that the resolution thereof tends to fail to satisfy the demand for displaying a high-resolution image. For example, the resolution supported by the DMD in the existing light machine is 2716*1528, whereas the resolution of the image to be displayed in reality is typically 3840*2160 higher than the resolution supported by the DMD, so the higher-resolution image typically has to be projected and displayed while losing information of some pixel.

If the resolution supported by the projection display device is improved simply by modifying the process of manufacturing it, then it will typically take a long period of time, so it is highly desirable to provide a technical solution to projecting and displaying a high-resolution image without losing any amount of information of original pixels in the high-resolution image, at the resolution supported by the existing projection display device to thereby satisfy the growing demand of the user for the image quality of the projection image.

In order to overcome the drawback of losing information of some pixel in the high-resolution image being projected and displayed in the prior art, embodiments of this disclosure provide a technical solution to processing a projection image by adjusting the image to be projected, to an image with the resolution thereof being an integer multiply of the resolution supported by a projection display device, then integrating pixels of the image into two images with their resolutions being no higher than the resolution supported by the projection display device, and further projecting them alternately, where these two images are projected alternately so that they are projected as a projection image including an amount of information of the pixels in the original image to be projected, due to the effect of visual persistence in human eyes, so if the resolution supported by the projection display device is lower than the resolution of the image to be projected, then the amount of information of the pixels carried in the image to be projected will be retained while the image is being projected and displayed, to thereby avoid the information of the pixels from being lost.

The embodiments of this disclosure will be described below in details with reference to the drawings.

Figure 2:
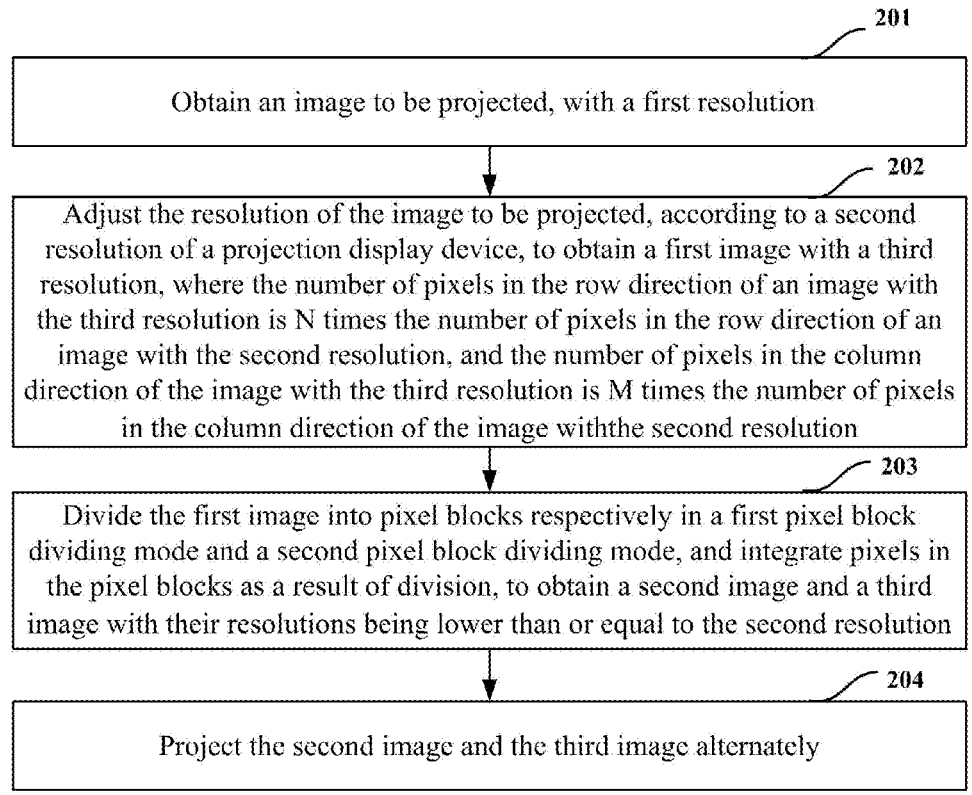
FIG. 2 is a schematic flow chart of a method for processing a projection image according to an embodiment of this disclosure.

FIG. 2 illustrates a schematic flow chart of a method for processing a projection image according to some embodiments of this disclosure, which can be performed in software or software and hardware, and which includes the following operations:

The operation 201 is to obtain an image to be projected, with a first resolution;

The operation 202 is to adjust the resolution of the image to be projected, according to a second resolution supported by a projection display device, to obtain a first image with a third resolution, where the number of pixels in the row direction of an image with the third resolution is N times the number of pixels in the row direction of an image with the second resolution, and the number of pixels in the column direction of the image with the third resolution is M times the number of pixels in the column direction of the image with the second resolution, where N and M are positive integers;

The operation 203 is to divide the first image into pixel blocks respectively in a first pixel block dividing mode and a second pixel block dividing mode, and to integrate pixels in the pixel blocks as a result of division, to obtain a second image and a third image with their resolutions being lower than or equal to the second resolution; and The operation 204 is to project the second image and the third image alternately.

Optionally in some embodiments of this disclosure, the resolution of the image to be projected can be adjusted according to the second resolution supported by the projection display device, and the first image with the third resolution can be obtained, in the operation 202 as follows without any limitation thereto:

The third resolution which is an integer multiple of the second resolution is determined according to the second resolution supported by the projection display device, and the first resolution of the image to be projected; a sampling frequency at which the image to be projected is to be resampled is determined according to the determined third resolution; and the image to be projected is resampled at the determined sampling frequency to thereby obtain the first image with the third resolution.

Particularly the third resolution can be represented as N*M times the second resolution, that is, the number of pixels in the row direction for the third resolution is N times the number of pixels in the row direction for the second resolution, and the number of pixels in the column direction for the third resolution is M times the number of pixels in the column direction for the second resolution, where both N and M are positive integers.

Optionally in some embodiments of this disclosure, the values of N and M can be smaller positive integers to thereby save processing resources as needed, for example, the third resolution can be 2*1 times the second resolution, or can be 1*2 times the second resolution, or can be 2*2 times the second resolution, or the like, where in some embodiments of this disclosure, if the third resolution is 2*2 times the second resolution, that is, both the numbers of pixels in the row direction and the column direction for the third resolution (which can be represented as a horizontal resolution and a vertical resolution) are twice the numbers of pixels in the row direction and the column direction for the second resolution supported by the projection display device, then the pixels will be subsequently integrated conveniently.

Optionally in some embodiments of this disclosure, the technical solution to processing a projection image can be applicable if the resolution of the image to be projected is lower than or equal to the resolution supported by the projection display device, or if the resolution of the image to be projected is higher than the resolution supported by the projection display device.

In view of the drawback in the prior art of projections of losing an amount of original information of the pixels in the image if the resolution of the image to be projected is higher than the resolution supported by the projection display device, some embodiments of this disclosure applicable if the resolution of the image to be projected is higher than the resolution supported by the projection display device will achieve a better technical effect thereof. Optionally in some embodiments of this disclosure, the first resolution is higher than the second resolution, and the third resolution is higher than the first resolution.

By way of an example, further to the laser projection display system in the prior art of projections, in some embodiments of this disclosure, if the resolution of the image to be projected, carrying 8M information of pixels is 3840*2160 (the first resolution), and the resolution supported by the projection display device is 2716*1528 (the second resolution), then the sampling frequency will be improved by a factor of 2, and the image to be projected will be resampled to obtain the first image (with the resolution of 5432*3056 (the third resolution)), where 5432 is equal to 2716*2, and 3056 is equal to 1528*2, so that the third resolution is 2*2 times the second resolution, that is, both the number of pixels in the row direction (the horizontal resolution), and the number of pixels in the column direction (the vertical resolution) for the third resolution are twice the number of pixels in the row direction, and the number of pixels in the column direction for the second resolution.

Figure 3:
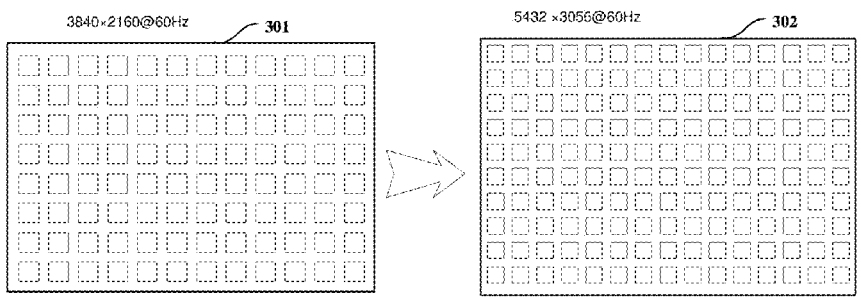
FIG. 3 is a schematic diagram of obtaining a first image from an image to be projected according to an embodiment of this disclosure.

FIG. 3 illustrates a schematic diagram of obtaining the first image from the image to be projected according to some embodiments of this disclosure, and as illustrated in FIG. 3, the resolution of the image to be projected 301 is 3840*2160, and the resolution of the first image 302 is 5432*3056, where 16M pixels carried in the first image 302 are obtained by resampling 8M pixels carried in the image to be projected 301, so the amount of original information of the pixels in the first image 302 has not been lost relative to the image to be projected 301.

Optionally in some embodiments of this disclosure, the image to be projected can be an image as a result of decoding the received video signal by an image signal processing system, where the resolution thereof can be obtained by the image signal processing system in a corresponding image software algorithm, the resolution supported by the projection display device can be written in advance into a file stored in the system, and retrieved by the image signal processing system, so that the appropriate sampling frequency can be determined, and the image to be projected can be resampled at the determined sampling frequency.

Optionally in some embodiments of this disclosure, the image signal processing system typically includes a buffer configured to buffer the first image as a result of resampling, so that the first image can be subsequently retrieved from the buffer.

Optionally in some embodiments of this disclosure, after the first image with the third resolution is obtained in the operation 202, the first image can be divided into pixel blocks respectively in the first pixel block dividing mode and the second pixel block dividing mode, the pixels in the pixel blocks as a result of division can be integrated, and the second image and the third image with their resolutions being lower than or equal to the second resolution can be obtained in the operation 203 in at least one embodiment as follows without any limitation thereto:

The first image is divided into pixel blocks in the first pixel block dividing mode, and the respective pixel blocks are integrated respectively to obtain the second image, where one pixel block is integrated into one pixel in the second image; and The first image is divided into pixel blocks in the second pixel block dividing mode, and the respective pixel blocks are integrated respectively to obtain the third image, where one pixel block is integrated into one pixel in the third image.

Optionally in some embodiments of this disclosure, there is a positional correspondence relationship between the pixel blocks into which the first image is divided in the first pixel block dividing mode, and the pixel blocks into which the first image is divided in the second pixel block dividing mode, and there is the same offset between two pixel blocks corresponding in position.

Here the offset between two pixel blocks corresponding in position can be represented as the number of pixels by which these two pixel blocks are spaced in the row direction, and the number of pixels by which they are spaced in the column direction, of the first image. Particularly this offset can also represent a misplacement relationship between the second image and the third image.

Particularly in some embodiments of this disclosure, N*M pixels adjacent to each other in the first image can be divided into one pixel block starting with pixels in the first row and the first column in the first image in the first pixel block division mode; and correspondingly, N*M pixels adjacent to each other in the first image can be divided into one pixel block starting with pixels in the first row and the second column in the first image in the second pixel block division mode. As can be apparent, there is a one-to-one positional correspondence between the pixel blocks into which the first image is divided in the first pixel block division mode, and the pixel blocks into which the first image is divided in the second pixel block division mode, and there is the same offset between two pixel blocks corresponding in position, where the offset can be represented as one pixel by which two pixel blocks corresponding at any position on the first image are spaced in the row direction; or In some further embodiments of this disclosure, the first pixel block division mode can be the same as described above; and N*M pixels adjacent to each other in the first image can be divided into one pixel block starting with pixels in the second row and the first column in the first image in the second pixel block division mode. As can be apparent, there is a one-to-one positional correspondence between the pixel blocks into which the first image is divided in the first pixel block division mode, and the pixel blocks into which the first image is divided in the second pixel block division mode, and there is the same offset between two pixel blocks corresponding in position, where the offset can be represented as one pixel by which two pixel blocks corresponding at any position on the first image are spaced in the column direction; or In some further embodiments of this disclosure, the first pixel block division mode can be the same as described above; and N*M pixels adjacent to each other in the first image can be divided into one pixel block starting with pixels in the second row and the second column in the first image in the second pixel block division mode. As can be apparent, there is a one-to-one positional correspondence between the pixel blocks into which the first image is divided in the first pixel block division mode, and the pixel blocks into which the first image is divided in the second pixel block division mode, and there is the same offset between two pixel blocks corresponding in position, where the offset can be represented as one pixel by which two pixel blocks corresponding at any position on the first image are spaced in both the row direction and the column direction.

In at least one embodiment, in some embodiments of this disclosure, if the first image is divided into pixel blocks in the first pixel block division mode as described above in which N*M pixels adjacent to each other in the first image are divided into one pixel block starting with pixels in the first row and the first column in the first image, then the same number of pixel blocks as the second resolution will be obtained, and then the respective pixel blocks will be integrated into respective pixels, thus resulting in the second image with the same resolution as the second resolution.

In at least one embodiment, in some embodiments of this disclosure, if the first image is divided into pixel blocks in the second pixel block division mode as described above in which N*M pixels adjacent to each other in the first image are divided into one pixel block starting with pixels in the first row and the second column in the first image, then the pixels in the first image other than the last column of pixels will be divided into pixel blocks in the second pixel block division mode, so that pixel blocks, the number of which is less than the second resolution are obtained, and then the respective pixel blocks will be integrated into respective pixels, thus resulting in the third image with the resolution thereof being lower than the second resolution; or the respective pixel blocks will be integrated into respective pixels, which are further combined with the last column of pixels, thus resulting in the third image with the same resolution as the second resolution.

Correspondingly in some further embodiments of this disclosure, if the first image is divided into pixel blocks in the second pixel block division mode as described above in which N*M pixels adjacent to each other in the first image are divided into one pixel block starting with pixels in the second row and the first column in the first image, then the pixels in the first image other than the last row of pixels will be divided into pixel blocks in the second pixel block division mode, and then the respective pixel blocks will be integrated into respective pixels, thus resulting in the third image with the resolution thereof being lower than the second resolution; or the respective pixel blocks will be integrated into respective pixels, which are further combined with the last row of pixels, thus resulting in the third image with the same resolution as the second resolution.

Correspondingly in some further embodiments of this disclosure, if the first image is divided into pixel blocks in the second pixel block division mode as described above in which N*M pixels adjacent to each other in the first image are divided into one pixel block starting with pixels in the second row and the second column in the first image, then the pixels in the first image other than the last row and the last column of pixels will be divided into pixel blocks in the second pixel block division mode, and then the respective pixel blocks will be integrated into respective pixels, thus resulting in the third image with the resolution thereof being lower than the second resolution; or the respective pixel blocks will be integrated into respective pixels, which are further combined with the last row and the last column of pixels, thus resulting in the third image with the same resolution as the second resolution.

Particularly in some embodiments of this disclosure, the first image can be divided into pixel blocks in the first pixel block division mode and/or the second pixel block division mode, so that there are N pixels in the row direction, and M pixels in the column direction, in the pixel blocks.

Figure 4:
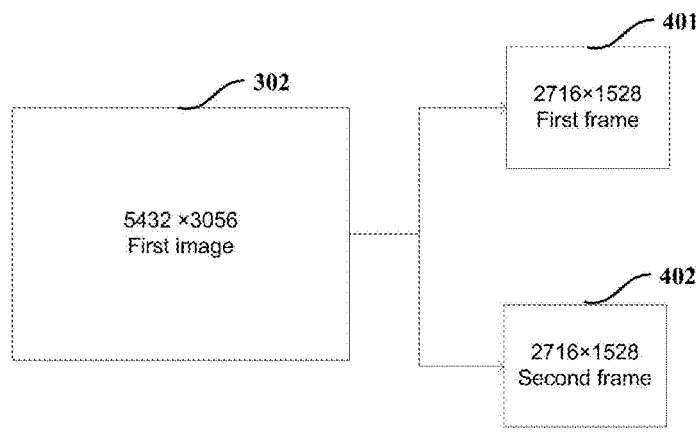
FIG. 4 is a schematic diagram of obtaining a second image and a third image from the first image according to an embodiment of this disclosure.

By way of an example, FIG. 4 illustrates an example of obtaining the second image 401 and the third image 402 from the first image 302 with the resolution of 5432*3056 obtained from the image to be projected 301 with the resolution of 3840*2160 as illustrated in FIG. 3.

As illustrated in FIG. 4, the first image 302 is divided into pixel blocks in the first pixel block division mode, and then the respective pixel blocks are integrated into respective pixels, thus resulting in the second image 401 with the resolution of 2716*1528; and the first image 302 is divided into pixel blocks in the second pixel block division mode, and then the respective pixel blocks are integrated into respective pixels, thus resulting in the third image 402 with the resolution of 2716*1528, so that the resolutions of the second image 401 and the third image 402 are the same as the resolution supported by the projection display device, i.e., the resolution for projection and display, which can be supported by the projection display device.

Figure 5:
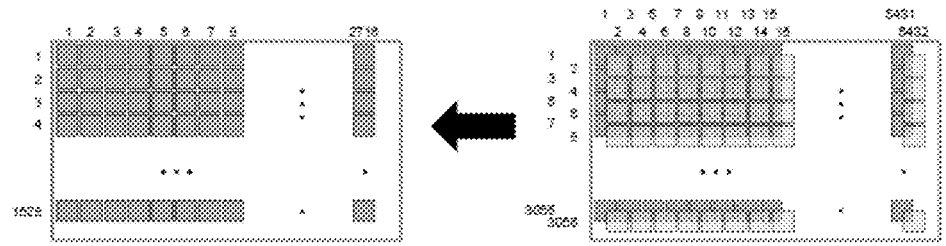
FIG. 5 is a schematic diagram of obtaining a second image or a third image from the first image according to an embodiment of this disclosure.

In at least one embodiment of this disclosure, FIG. 5 illustrates an example of dividing the first image 302 into pixel blocks further to FIG. 3 and FIG. 4. As illustrated in FIG. 5, 2*2 pixels adjacent to each other in the first image 302 can be divided into one pixel block starting with pixels in the first row and the first column in the first image 302 in the first pixel block division mode; and 2*2 pixels adjacent to each other in the first image 302 can be divided into one pixel block starting with pixels in the second row and the second column in the first image 302 in the second pixel block division mode.

Figure 6A:
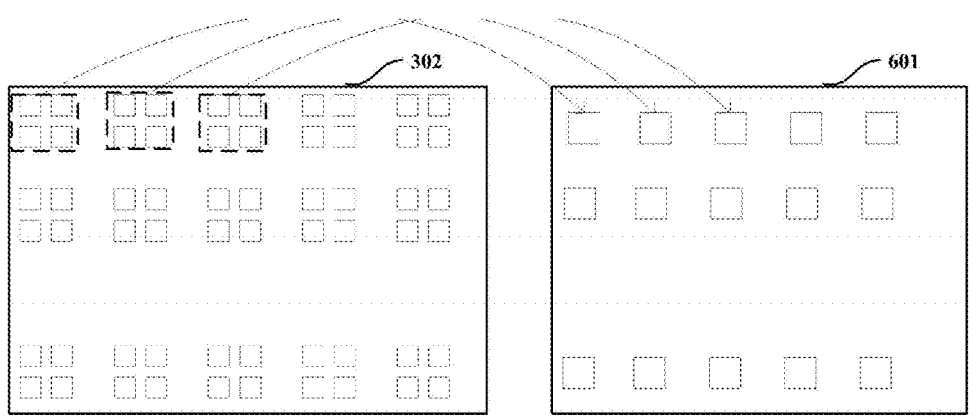
FIG. 6A is a schematic diagram of obtaining a second image from the first image according to an embodiment of this disclosure.
Figure 6B:
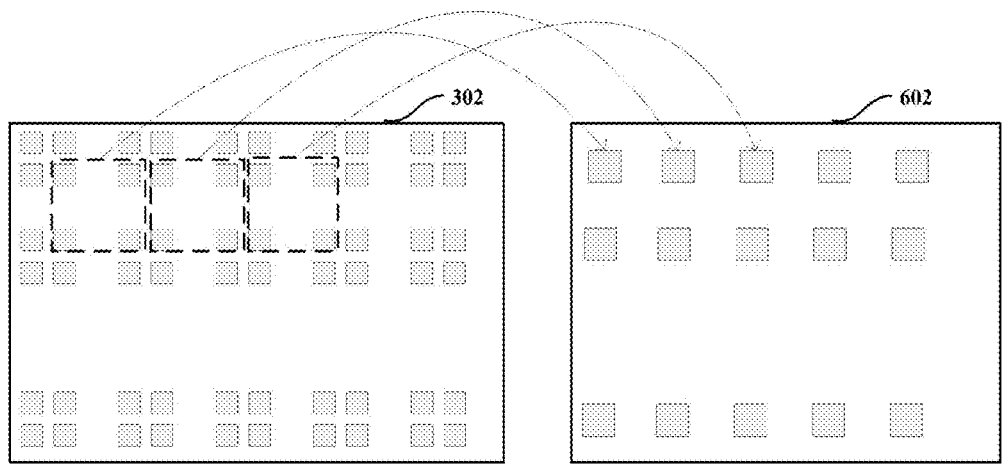
FIG. 6B is a schematic diagram of obtaining a third image from the first image according to an embodiment of this disclosure.

Further to the example of dividing the first image 302 into pixel blocks as illustrated in FIG. 5, FIG. 6A illustrates a schematic diagram of obtaining the second image 601 from the first image 302, and FIG. 6B illustrates a schematic diagram of obtaining the third image 602 from the first image 302.

For the first image 302 with the resolution of 5432*3056, firstly the first image 302 can be divided into pixel blocks in such a division mode that 2*2 pixels adjacent to each other in the first image 302 are divided into one pixel block starting with pixels in the first row and the first column, and the respective pixel blocks can be integrated into the second image 601 with the resolution of 2716*1528, as illustrated in FIG. 6A; and then the first image 302 can be divided into pixel blocks in such a division mode that 2*2 pixels adjacent to each other in the first image 302 are divided into one pixel block starting with pixels in the second row and the second column, and the respective pixel blocks can be integrated into the third image 602 with the resolution of 2716*1528, as illustrated in FIG. 6B, where among the pixel blocks into which the first image is divided in the division mode as illustrated in FIG. 6A, and the pixel blocks into which the first image is divided in the division mode as illustrated in FIG. 6B, there is the same relative positional relationship between every two pixel blocks corresponding in position (e.g., A in FIGS. 6A, and B in FIG. 6B represent two pixel blocks corresponding in position), and there is the same spacing between them, for example, B in FIG. 6B is misplaced down-rightward from A in FIG. 6A by one pixel.

It shall be appreciated that N*M pixels adjacent to each in the first image are divided into one pixel block starting with pixels at two different positions on the first image respectively in the first pixel block division mode and the second pixel block division mode, as described above merely by way of an example, so that the pixels are subsequently integrated conveniently while saving the processing resources of the system, but the embodiments of this disclosure will not be limited to any particular implementations of the first pixel block division mode and the second pixel block division mode.

In at least one embodiment, in some embodiments of this disclosure, after the second image and the third image are obtained in the operation 203, the second image and the third image can be projected alternately as described in the operation 204.

Particularly as described above, the DLP projector in the prior art of projections and displays generally includes the DMD chip which is a core element configured to project and display an image, and since the DMD chip is both an optic-mechanical device and an electric-mechanical device, the DMD chip can be electrically driven by a drive signal controlled to be output from a drive chip to project the image.

In some embodiments of this disclosure, the projection display device can be a DMD chip which typically includes P drive chips, where P is a positive integer. The drive capacity of each drive chip can be set and adjusted without exceeding the upper limit of the drive capacity thereof.

In at least one embodiment of this disclosure, if the projection display device includes the DMD chip, then the second image and the third image obtained in the operation 203 will be output alternately to the projection display device in sequence at a preset interval of time for projection and display thereon, where the second image and the third image can be output to the projection display device for projection and display thereon by dividing the second image or the third image to be projected and displayed, into P components according to the drive capacities of the drive chips in the DMD chip, and transmitting them respectively to the P drive chips in the DMD chip, so that the P drive chips output corresponding drive signals according to their received image information to drive the DMD chip to project and display the image.

Figure 7:
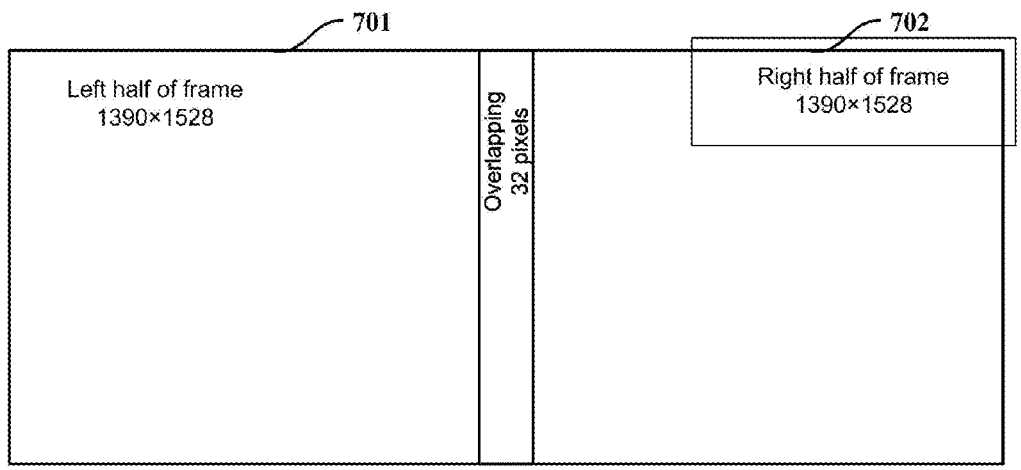
FIG. 7 is a schematic diagram of projecting the second image or the third image according to an embodiment of this disclosure.

For example, further to the examples illustrated in FIG. 3 to FIG. 6, if the projection display device is a currently common DMD chip with the resolution of 2716*1528 driven by two drive chips, then after the second image 601 and the third image 602, both of which have the resolution of 2716*1528, the second image 601 and the third image 602 can be projected and displayed while the DMD chip is being driven by the two drive chips, for example, the second image 601 can be projected and displayed as described below:

If both the drive capacities of the two drive chips in the DMD chip are 1390*1528, then the second image 601 with the resolution of 2716*1528 will be equally divided into left and right halves (in the column direction), that is, each of the left and right halves includes 1358*1528 pixels; and furthermore 32 columns of pixels will be added to the tail of the left half while 32 columns of pixels are added to the head of the right half, so that both the left and right halves have the resolution of 1390*1528, and can be output respectively to the two drive chips, which further drive the DMD chip respectively. Since the resolution of the DMD chip is 2716*1528, the drive chips will remove the added 32 columns of pixels in the left and right halves of frame before outputting their drive signals to the DMD chip, so that there are still **2716*1528 useful pixels, particularly the left half of frame 701 and the right half of frame 702 as illustrated in FIG. 7, which further drive the DMD chip to project and display the entire second image 601**; or The drive capacities of the two drive chips in the DMD chip can be adjusted respectively to 1358*1528, so that the left and right halves of the second image 601 (the left and right halves of frame) can be transmitted respectively to these two drive chips without superimposing any pixels, so that these two drive chips output their drive signals according to the information in their received halves of frame to drive the DMD chip to project and display the entire second image 601.

Here the third image 602 can be projected and displayed in the same way as the second image 601 projected and displayed as described above.

In some embodiments of this disclosure, the second image and the third image can be projected alternately by projecting and displaying the third image 602 at the preset interval of time after the second image 601 is projected and displayed, and correspondingly further projecting and displaying the second image 601 at the preset interval of time after the third image 602 is projected and displayed, where the preset interval of time can be represented as a refresh frequency of the projection display device, which can be determined based upon the effect of visual persistence in human eyes, and which can be preset between 60 Hz and 120 Hz.

In at least one embodiment, in some embodiments of this disclosure, since there is a positional correspondence relationship between the pixel blocks into which the first image is divided in the first pixel block dividing mode, and the pixel blocks into which the first image is divided in the second pixel block dividing mode, and there is the same offset between two pixel blocks corresponding in position, so that there is also a corresponding offset between the obtained second image and third image, in some embodiments of this disclosure, in order to prevent the projection image from being blurred on the screen while the second image and the third image are being projected and displayed alternately, there will be such an offset made between the projection direction of the second image, and the projection direction of the third image that corresponds to the offset between two pixel blocks corresponding in position after the second image and the third image are divided into pixel blocks.

In some embodiments of this disclosure, the second image and the third image can be projected alternately as follows:

A first deflection angle corresponding to the first pixel block division mode, and a second deflection angle corresponding to the second pixel block division mode are determined; the projection angle of the second image is adjusted according to the first deflection angle; and the projection angle of the third image is adjusted according to the second deflection angle.

Particularly the first deflection angle corresponding to the first pixel block division mode, and the second deflection angle corresponding to the second pixel block division mode can be determined respectively according to the offset between pixel blocks corresponding in position after the second image and the third image are divided into pixel blocks, so that the projection angle of the second image is adjusted according to the first deflection angle, and the projection angle of the third image is adjusted according to the second deflection angle, thus resulting in the offset corresponding to the offset between two pixel blocks corresponding in position after the second image and the third image are divided into pixel blocks, so as to prevent the projection image from being blurred on the screen.

In at least one embodiment, in some embodiments of this disclosure, the projection angle of the second image can be adjusted according to the first deflection angle, and the projection angle of the third image can be adjusted according to the second deflection angle, by controlling a light beam angle varying device arranged between the projection display device, and the lens to be reflected respectively at the first deflection angle and the second deflection angle.

In some embodiments of this disclosure, before or at the same time as the second image is output to the projection display device, the light beam angle varying device can be adjusted to the first deflection angle so that the angle at which the projection display device projects the second image is adjusted by the light beam angle varying device, and the second image is further output to the lens for imaging, and projected onto a projection medium, thus resulting in the projection image; and after the second image is projected, or before the third image is output to the projection display device for projection, the light beam angle varying device can be adjusted to the second deflection angle so that the angle at which the projection display device projects the third image is adjusted by the light beam angle varying device, and the third image is further output to the lens for imaging, and projected onto the projection medium, thus resulting in the projection image, so that there is such an offset between the two projection image that corresponds to the offset between two pixel blocks corresponding in position after the second image and the third image are divided into pixel blocks.

In some embodiments of this disclosure, the light beam angle varying device can be embodied as an imaging shifting device which can be a vibrating mirror device. Particularly the vibrating mirror device can be a transmitting mirror which can be deflected at a varying angle so that a light beam is projected by the projection display device in a varying direction (i.e., at varying projection angles of the second image and the third image); or the vibrating mirror device can be a reflecting mirror which can be deflected at a varying angle so that light rays are reflected at a varying angle.

In at least one embodiment of this disclosure, an initial position of the light beam angle varying device can be set to a position corresponding to the projection angle of the second image, that is, the first deflection angle is 0 degree, and the second deflection angle can be determined according to the displacement relationship between the positions of the second image and the third image, thus simplifying the control on the light beam angle varying device.

Figure 8A:
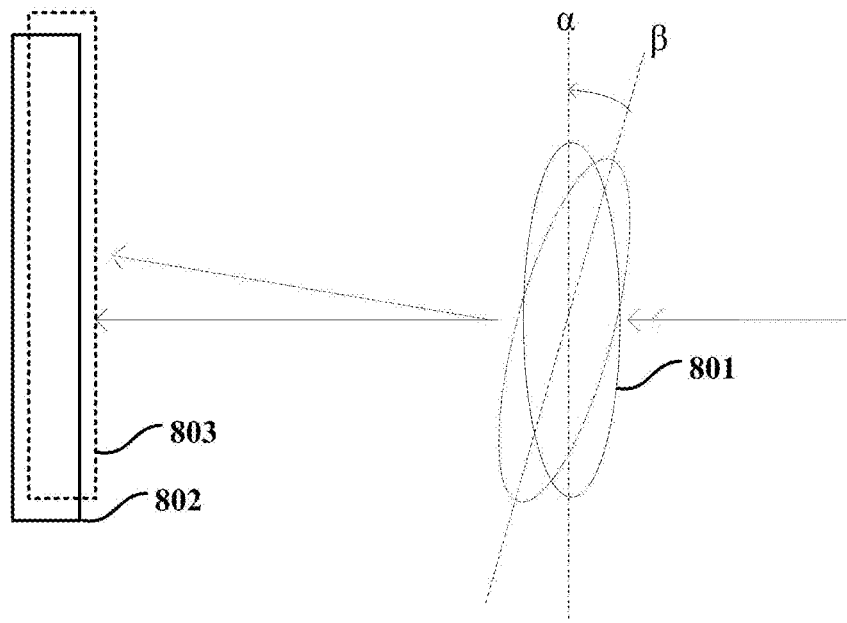
FIG. 8A is a schematic diagram of a light path over which the second image or the third image is projected according to an embodiment of this disclosure.
Figure 8B:
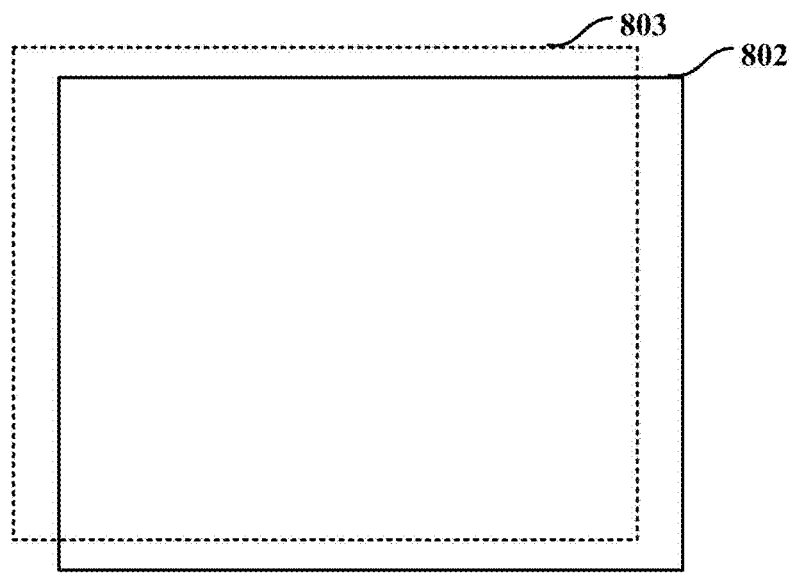
FIG. 8B is a schematic diagram of imaging the second image or the third image being projected according to an embodiment of this disclosure.

For example, FIG. 8A illustrates a schematic diagram of a light path over which the second image or the third image is projected, where the light beam angle varying device is a vibrating mirror device 801 configured to create a light path over which the second image is projected, and a light path over which the third image is projected, and correspondingly FIG. 8B illustrates a schematic diagram of projection image on the projection medium after the second image and the third image projected over the light paths illustrated in FIG. 8A are imaged by the lens.

Here the vibrating mirror device 801 is deflected at the first deflection angle $\alpha$ (the initial angle $\alpha=0$ degree), thus resulting in the light path over which the second image is projected, and an optical signal corresponding to the second image passes the vibrating mirror device 801 deflected at the first deflection angle $\alpha$, and then arrives at the lens for imaging, thus resulting in the projection image 802; and the vibrating mirror device 801 is deflected at the second deflection angle $\beta$, thus resulting in the light path over which the third image is projected, and an optical signal corresponding to the third image passes the vibrating mirror device 801 deflected at the second deflection angle $\beta$, and then arrives at the lens for imaging, thus resulting in the projection image 803, so that there is a corresponding displacement relationship between the second image and the third image being imaged, and furthermore the projection image 802 and 803 corresponding respectively to the second image and the third image are integrated into the displayed image 301 to be projected, due to the effect of visual persistence in human eyes without being blurred on the screen.

It shall be appreciated that the technical solution according to some embodiments of the disclosure can be implemented without modifying the original optical elements, and the architecture of the original light paths, in the existing projection display device, and the system thereof. For example, taking the DLP projector including the DMD chip as an example, the light source outputs the three primary colors in sequence according to the information about the colors of the pixels to be displayed in the second image and the third image, and the DMD chip reflects the light beams of the light source to thereby embody the information carried in the pixels in the image frame to be displayed, in the same process as the image displayed by the DMD chip in the existing DLP projector.

While the second image and the third image are being projected alternately in the operation 204, the optical signal corresponding to the second image, and the optical signal corresponding to the third image arrive at the lens in sequence, and the second image and the third image are visually integrated due to the effect of visual persistence in human eyes, where both the second image and the third image can carry respective halves of the amount of information in the original image to be projected, so that the image to be projected can be projected and displayed without losing any amount of information thereof. For example, the resolution of the original image to be projected is 3840*2160, that is, the image to be projected includes an amount of information of 3840*2160 pixels, and with the technical solution according to the embodiments of this disclosure, firstly the original image to be projected is extended to the first image with the resolution of 5432*3056, and then the pixels in the pixel blocks are integrated into the second image and the third image, which carry an amount of information of 2716*1528 pixels respectively, without losing any amount of information of the pixels in the original image to be projected.

In at least one embodiment of this disclosure, the second image and the third image can be projected alternately by processing the edges of the second image and the third image as in the prior art of projections and displays.

For example, in order to equalize the brightness of the projection image, the edges of those components which do not overlap between the second image and the third image can be discarded, thus resulting in such an overlapping component that equivalently carries twice an amount of information of 2715*1527 pixels, which can be regarded the same as the number of pixels in the original image to be projected, with the resolution of 3840*2160, i.e., 8M, thus reserving the amount of information of the original image to be projected; or the edges of the second image and the third image can be further processed, for example, by overlapping their pixels, thus resulting in an overlapping component including 2712*1528 pixels, which equivalently carries twice 2712*1527 pixels, where although some edge pixels are lost, these pixels can be ignored as compared with the total amount 8M of information of the pixels carried in the original image to be projected, that is, the amount of information in the original image to be projected can be approximately reserved to thereby attain the effect of reserving the amount of information in the original image, displaying the image including a large amount of information, and improving the projection image.

As can be apparent from the description above, in the method for processing a projection image according to the embodiments of this disclosure, firstly the resolution of the image to be projected is adjusted according to the resolution supported by the projection display device, and such a first image is obtained that the numbers of pixels thereof in the row direction and the column direction are integer multiples of the numbers of pixels in the row direction and the column direction for the resolution supported by the projection display device respectively; then the first image is divided into pixel blocks, and the pixels in the pixel blocks are integrated into the second image and the third image with their resolutions being lower than or equal to the resolution supported by the projection display device; and next the second image and the third image are projected alternately. As can be apparent, if there is a high resolution of the image to be projected, then with the technical solution according to the embodiments of this disclosure, firstly the high-resolution image to be projected will be adjusted to the image with the resolution thereof being an integer multiple of the resolution supported by the projection display device, and then the pixels will be integrated into the two images with their resolutions being lower than or equal to the resolution supported by the projection display device, so that these two images can be projected alternately to thereby project and display the high-resolution image to be projected, without losing any amount of original information of the pixels thereof, thus overcoming the drawback in the prior art of losing the information of pixels in the high-resolution image being projected and displayed, so as to reserve the amount of information of the pixels carried in the high-resolution image being projected and displayed.

Based upon the same inventive idea, an embodiment of this disclosure further provides a device for processing a projection image, where the device can be embodied in an image software algorithm implemented through software programming, or can be embodied in hardware plus software programming, and the device can be configured to perform the embodiments of the method above for processing a projection image. FIG. 9 illustrates a schematic structural diagram of a device for processing a projection image according to some embodiments of this disclosure.

Figure 9A:
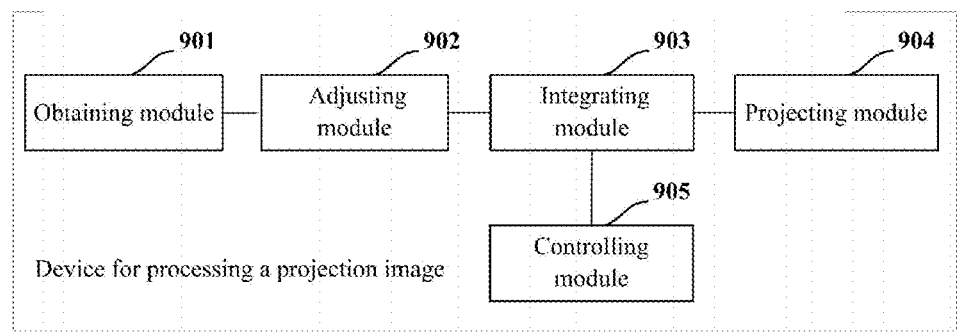
FIG. 9A is a schematic structural diagram of a device for projecting a projection image according to an embodiment of this disclosure.
Figure 9B:
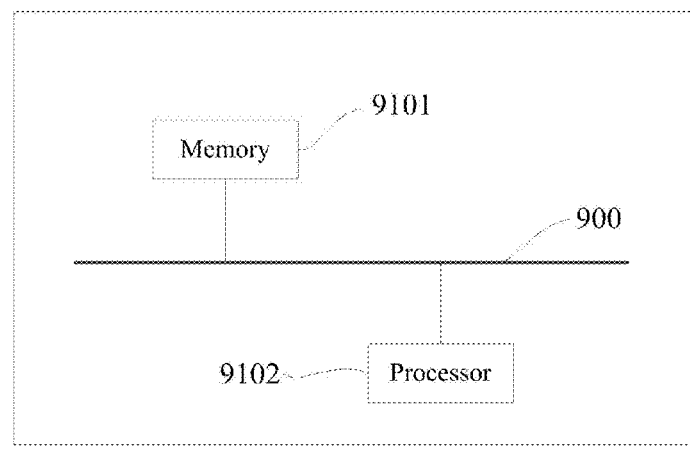
FIG. 9B is a schematic structural diagram of a device for projecting a projection image according to another embodiment of this disclosure.

As illustrated in FIG. 9A, the device for processing a projection image according to some embodiments of this disclosure includes:

An obtaining module 901 is configured to obtain an image to be projected, with a first resolution;

An adjusting module 902 is configured to adjust the resolution of the image to be projected, according to a second resolution supported by a projection display device, to obtain a first image with a third resolution, where the number of pixels in the row direction of an image with the third resolution is N times the number of pixels in the row direction of an image with the second resolution, and the number of pixels in the column direction of the image with the third resolution is M times the number of pixels in the column direction of the image with the second resolution, where N and M are positive integers;

An integrating module 903 is configured to divide the first image into pixel blocks respectively in a first pixel block dividing mode and a second pixel block dividing mode, and to integrate pixels in the pixel blocks as a result of division, to obtain a second image and a third image with their resolutions being lower than or equal to the second resolution; and A projecting module 904 is configured to project the second image and the third image alternately.

Optionally in some embodiments of this disclosure, the adjusting module 902 can be configured to determine the third resolution which is an integer multiple of the second resolution, according to the second resolution supported by the projection display device, and the resolution of the image to be projected; to determine a sampling frequency at which the image to be projected is to be resampled, according to the determined third resolution; and to resample the image to be projected, at the determined sampling frequency to thereby obtain the first image with the third resolution.

Optionally in some embodiments of this disclosure, the integrating module 903 can be configured:

To divide the first image into pixel blocks in the first pixel block dividing mode, and to integrate the respective pixel blocks respectively to obtain the second image, where one pixel block is integrated into one pixel in the second image; and To divide the first image into pixel blocks in the second pixel block dividing mode, and to integrate the respective pixel blocks respectively to obtain the third image, where one pixel block is integrated into one pixel in the third image.

Optionally in some embodiments of this disclosure, there is a positional correspondence relationship between the pixel blocks into which the first image is divided in the first pixel block dividing mode, and the pixel blocks into which the first image is divided in the second pixel block dividing mode, and there is the same offset between two pixel blocks corresponding in position.

Optionally in some embodiments of this disclosure, the first pixel block division mode can include: dividing N*M pixels adjacent to each other in the first image into one pixel block starting with pixels in the first row and the first column in the first image; and The second pixel block division mode can include:

Dividing N*M pixels adjacent to each other in the first image into one pixel block starting with pixels in the first row and the second column in the first image; or Dividing N*M pixels adjacent to each other in the first image into one pixel block starting with pixels in the second row and the first column in the first image; or Dividing N*M pixels adjacent to each other in the first image into one pixel block starting with pixels in the second row and the second column in the first image.

Optionally in some embodiments of this disclosure, there are N pixels in the row direction, and M pixels in the column direction in the pixel block obtained in the first pixel block division mode and/or the second pixel block division mode.

Optionally in some embodiments of this disclosure, the device can further include a controlling module 905;

Particularly the controlling module 905 can be configured to determine a first deflection angle corresponding to the first pixel block division mode, and a second deflection angle corresponding to the second pixel block division mode; to deflect a light beam angle varying device to be deflected at the first deflection angle; and to deflect the light beam angle varying device to be deflected at the second deflection angle, where the light beam angle varying device is arranged between the projection display device, and a lens.

Optionally in some embodiments of this disclosure, the first resolution is higher than the second resolution, and the third resolution is higher than the first resolution.

Based upon the same inventive idea, an embodiment of this disclosure further provides another device for processing a projection image, where the device includes a memory 9101 and a processor 9102, both of which can be connected over a bus 9100 or a dedicated connection line. They are connected over the bus 900 in FIG. 9B. The memory 901 is configured to store instructions, and the processor 9102 is configured to execute the instructions stored in the memory 9101 to perform the operations of:

At least one processor; and

A memory communicatively connected with the at least one processor, configured to store at least one processor executable instruction to be executed by the at least one processor to cause the at least one processor to perform the operations of:

Obtaining an image to be projected, with a first resolution;

Adjusting the resolution of the image to be projected, according to a second resolution supported by a projection display device, to obtain a first image with a third resolution, wherein a number of pixels in a row direction of an image with the third resolution is N times a number of pixels in a row direction of an image with the second resolution, and a number of pixels in a column direction of the image with the third resolution is M times a number of pixels in a column direction of the image with the second resolution, wherein N and M are positive integers;

Dividing the first image into pixel blocks respectively in a first pixel block dividing mode and a second pixel block dividing mode, and integrating pixels in the pixel blocks as a result of division, to obtain a second image and a third image with their resolutions being lower than or equal to the second resolution; and Projecting the second image and the third image alternately.

Optionally in some embodiments of this disclosure, the dividing the first image into pixel blocks respectively in the first pixel block dividing mode and the second pixel block dividing mode, and integrating the pixels in the pixel blocks as a result of division, to obtain the second image and the third image with their resolutions being lower than or equal to the second resolution includes:

Dividing the first image into pixel blocks in the first pixel block dividing mode, and integrating the respective pixel blocks respectively to obtain the second image, where one pixel block is integrated into one pixel in the second image; and Dividing the first image into pixel blocks in the second pixel block dividing mode, and integrating the respective pixel blocks respectively to obtain the third image, where one pixel block is integrated into one pixel in the third image.

Optionally in some embodiments of this disclosure, there is a positional correspondence relationship between the pixel blocks into which the first image is divided in the first pixel block dividing mode, and the pixel blocks into which the first image is divided in the second pixel block dividing mode, and there is the same offset between two pixel blocks corresponding in position.

Optionally in some embodiments of this disclosure, the first pixel block division mode includes: dividing N*M pixels adjacent to each other in the first image into one pixel block starting with pixels in the first row and the first column in the first image; and The second pixel block division mode includes:

Dividing N*M pixels adjacent to each other in the first image into one pixel block starting with pixels in the first row and the second column in the first image; or Dividing N*M pixels adjacent to each other in the first image into one pixel block starting with pixels in the second row and the first column in the first image; or Dividing N*M pixels adjacent to each other in the first image into one pixel block starting with pixels in the second row and the second column in the first image.

Optionally in some embodiments of this disclosure, there are N pixels in the row direction, and M pixels in the column direction in the pixel block obtained in the first pixel block division mode and/or the second pixel block division mode.

Optionally in some embodiments of this disclosure, the projecting the second image and the third image alternately includes:

Determining a first deflection angle corresponding to the first pixel block division mode, and a second deflection angle corresponding to the second pixel block division mode;

Adjusting the deflection angle of the second image according to the first deflection angle; and Adjusting the deflection angle of the third image according to the second deflection angle.

Optionally in some embodiments of this disclosure, the first resolution is higher than the second resolution, and the third resolution is higher than the first resolution.

Figure 10:
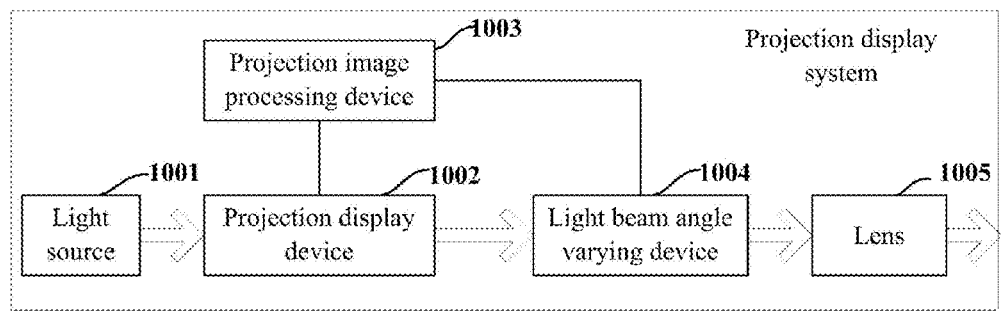
FIG. 10 is a schematic structural diagram of a projection display system according to an embodiment of this disclosure.

Based upon the same inventive idea, an embodiment of this disclosure further provides a projection display system, which can perform the flow of the method for processing a projection image according to the embodiments above, and which can project and display an image in the flow of the method for processing a projection image according to the embodiments above. FIG. 10 illustrates a schematic structural diagram of a projection display system according to some embodiments of this disclosure.

As illustrated in FIG. 10, the projection display system according to some embodiments of this disclosure includes a light source 1001, a projection display device 1002, a projection image processing device 1003, a light beam angle varying device 1004, and a lens 1005, where the light beam angle varying device 1004 can be arranged between the projection display device 1002, and the lens 1005; and the projection image processing device 1003 can be particularly as described in the embodiments above.

Particularly the light beam angle varying device 1004 is configured to be controlled by the projection image processing device 1003 to be deflected. The light source 1001 provides the projection display device 1002 with illumination, and the projection display device 1002 projects the image which is output by the light beam angle varying device 1004 to the lens 1005 for imaging, so that the image is projected onto a projection medium, thus resulting in the projection image, where the light beam can be transmitted over a light path as denoted by the arrows in FIG. 10.

It shall be appreciated that the projection display system according to some embodiments of this disclosure can be implemented further to the existing projection display device and system, and FIG. 10 merely illustrates a projection display system according to some embodiments of this disclosure by way of an example, but other optical elements and a particular optical architecture for assisting with creating the light path, and projecting and displaying the image can be implemented as in the existing projection display device or system, so a repeated description thereof will be omitted here. For example, the projection display device 1002 can be embodied as the projection display device in the existing projection display device, e.g., the DMD chip in the DLP projector; and the lens 1005, the light source 1001, and the other optical elements and the particular optical architecture for creating the light path, and projecting and displaying the image can be embodied as in the existing projection display device or system.

Optionally in some embodiments of this disclosure, the projection display device 1002 can include a DMD chip including P drive chips, where P is a positive integer. The drive capacity of each drive chip can be set and adjusted without exceeding the upper limit of the drive capacity thereof.

In at least one embodiment of this disclosure, further to the projection display device including the DMD chip, in some embodiments of this disclosure, the projection image processing device 1003 can output the second image and the third image alternately to the projection display device 1002 in sequence at a preset interval of time for projection and display thereon, where the second image and the third image can be output to the projection display device for projection and display thereon by dividing the second image or the third image to be projected and displayed, into P components according to the drive capacities of the drive chips in the DMD chip, and transmitting them respectively to the P drive chips in the DMD chip, so that the P drive chips output corresponding drive signals according to their received image information to drive the DMD chip to project and display the image.

In at least one embodiment of this disclosure, the projection image processing device 1003 can be further configured to determine a first deflection angle corresponding to the first pixel block division mode, and a second deflection angle corresponding to the second pixel block division mode; to control the light beam angle varying device 1004 to be varied at the first deflection angle to thereby adjust the projection angle of the second image; and to control the light beam angle varying device 1004 to be varied at the second deflection angle to thereby adjust the projection angle of the third image.

If these technologies are implemented in software, then they will be implemented in modules (e.g., programs, functions, etc.) configured to perform the functions described here. The software codes can be stored in a memory unit, and executed by a processor. The memory unit can reside inside or outside the processor.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for processing a projection image, the method comprising:
    obtaining an image to be projected, with a first resolution;
    adjusting the resolution of the image to be projected, according to a second resolution supported by a projection display device, to obtain a first image with a third resolution, wherein a number of pixels in a row direction of an image with the third resolution is N times a number of pixels in a row direction of an image with the second resolution, and a number of pixels in a column direction of the image with the third resolution is M times a number of pixels in a column direction of the image with the second resolution, wherein N and M are positive integers;
    dividing the first image into pixel blocks respectively in a first pixel block dividing mode and a second pixel block dividing mode, and integrating pixels in the pixel blocks as a result of division, to obtain a second image and a third image with their resolutions being lower than or equal to the second resolution; and
    projecting the second image and the third image alternately.

2. The method according to claim 1, wherein the dividing the first image into pixel blocks respectively in the first pixel block dividing mode and the second pixel block dividing mode, and integrating the pixels in the pixel blocks as a result of division, to obtain the second image and the third image with their resolutions being lower than or equal to the second resolution comprises:

dividing the first image into pixel blocks in the first pixel block dividing mode, and integrating the respective pixel blocks respectively to obtain the second image, wherein one pixel block is integrated into one pixel in the second image; and dividing the first image into pixel blocks in the second pixel block dividing mode, and integrating the respective pixel blocks respectively to obtain the third image, wherein one pixel block is integrated into one pixel in the third image.

3. The method according to claim 2, wherein there is a positional correspondence relationship between the pixel blocks into which the first image is divided in the first pixel block dividing mode, and the pixel blocks into which the first image is divided in the second pixel block dividing mode, and there is a same offset between two pixel blocks corresponding in position.

4. The method according to claim 1, wherein there is a positional correspondence relationship between the pixel blocks into which the first image is divided in the first pixel block dividing mode, and the pixel blocks into which the first image is divided in the second pixel block dividing mode, and there is a same offset between two pixel blocks corresponding in position.

5. The method according to claim 4, wherein the first pixel block division mode comprises: dividing N*M pixels adjacent to each other in the first image into one pixel block starting with pixels in the first row and the first column in the first image; and the second pixel block division mode comprises:

dividing N*M pixels adjacent to each other in the first image into one pixel block starting with pixels in the first row and the second column in the first image; or dividing N*M pixels adjacent to each other in the first image into one pixel block starting with pixels in the second row and the first column in the first image; or dividing N*M pixels adjacent to each other in the first image into one pixel block starting with pixels in the second row and the second column in the first image.

6. The method according to claim 1, wherein there are N pixels in the row direction, and M pixels in the column direction in the pixel block obtained in the first pixel block division mode and/or the second pixel block division mode.

7. The method according to claim 1, wherein the projecting the second image and the third image alternately comprises:

determining a first deflection angle corresponding to the first pixel block division mode, and a second deflection angle corresponding to the second pixel block division mode;

adjusting a deflection angle of the second image according to the first deflection angle; and adjusting a deflection angle of the third image according to the second deflection angle.

8. The method according to claim 1, wherein the first resolution is higher than the second resolution, and the third resolution is higher than the first resolution.

9. A device for processing a projection image, the device comprising:

at least one processor; and a memory communicatively connected with the at least one processor, configured to store at least one processor executable instruction to be executed by the at least one processor to cause the at least one processor to perform the operations of:

obtaining an image to be projected, with a first resolution;

adjusting the resolution of the image to be projected, according to a second resolution supported by a projection display device, to obtain a first image with a third resolution, wherein a number of pixels in a row direction of an image with the third resolution is N times a number of pixels in a row direction of an image with the second resolution, and a number of pixels in a column direction of the image with the third resolution is M times a number of pixels in a column direction of the image with the second resolution, wherein N and M are positive integers;

dividing the first image into pixel blocks respectively in a first pixel block dividing mode and a second pixel block dividing mode, and integrating pixels in the pixel blocks as a result of division, to obtain a second image and a third image with their resolutions being lower than or equal to the second resolution; and projecting the second image and the third image alternately.

10. The device according to claim 9, wherein the dividing the first image into pixel blocks respectively in the first pixel block dividing mode and the second pixel block dividing mode, and integrating the pixels in the pixel blocks as a result of division, to obtain the second image and the third image with their resolutions being lower than or equal to the second resolution comprises:

dividing the first image into pixel blocks in the first pixel block dividing mode, and integrating the respective pixel blocks respectively to obtain the second image, wherein one pixel block is integrated into one pixel in the second image; and dividing the first image into pixel blocks in the second pixel block dividing mode, and integrating the respective pixel blocks respectively to obtain the third image, wherein one pixel block is integrated into one pixel in the third image.

11. The device according to claim 10, wherein there is a positional correspondence relationship between the pixel blocks into which the first image is divided in the first pixel block dividing mode, and the pixel blocks into which the first image is divided in the second pixel block dividing mode, and there is a same offset between two pixel blocks corresponding in position.

12. The device according to claim 9, wherein there is a positional correspondence relationship between the pixel blocks into which the first image is divided in the first pixel block dividing mode, and the pixel blocks into which the first image is divided in the second pixel block dividing mode, and there is a same offset between two pixel blocks corresponding in position.

13. The device according to claim 12, wherein the first pixel block division mode comprises: dividing N*M pixels adjacent to each other in the first image into one pixel block starting with pixels in the first row and the first column in the first image; and the second pixel block division mode comprises:

dividing N*M pixels adjacent to each other in the first image into one pixel block starting with pixels in the first row and the second column in the first image; or dividing N*M pixels adjacent to each other in the first image into one pixel block starting with pixels in the second row and the first column in the first image; or dividing N*M pixels adjacent to each other in the first image into one pixel block starting with pixels in the second row and the second column in the first image.

14. The device according to claim 9, wherein there are N pixels in the row direction, and M pixels in the column direction in the pixel block obtained in the first pixel block division mode and/or the second pixel block division mode.

15. The device according to claim 9, wherein the projecting the second image and the third image alternately comprises:
   determining a first deflection angle corresponding to the first pixel block division mode, and a second deflection angle corresponding to the second pixel block division mode;
   adjusting a deflection angle of the second image according to the first deflection angle; and
   adjusting a deflection angle of the third image according to the second deflection angle.

16. The device according to claim 9, wherein the first resolution is higher than the second resolution, and the third resolution is higher than the first resolution.

17. A projection display system, comprising a light source, a projection display device, a projection image processing device, a light beam angle varying device, and a lens, wherein:
   the light beam angle varying device is arranged between the projection display device and the lens, and configured to be controlled by the projection image processing device to be deflected;
   the light source provides the projection display device with illumination, and the projection display device projects the image which is output by the light beam angle varying device to the lens for imaging, so that the image is projected onto a projection medium, thus resulting in the projection image; and
   the projection image processing device comprises:
   at least one processor; and
   a memory communicatively connected with the at least one processor, configured to store at least one processor executable instruction to be executed by the at least one processor to cause the at least one processor to perform the operations of:
obtaining an image to be projected, with a first resolution;
adjusting the resolution of the image to be projected, according to a second resolution supported by a projection display device, to obtain a first image with a third resolution, wherein a number of pixels in a row direction of an image with the third resolution is N times a number of pixels in a row direction of an image with the second resolution, and a number of pixels in a column direction of the image with the third resolution is M times a number of pixels in a column direction of the image with the second resolution, wherein N and M are positive integers;
dividing the first image into pixel blocks respectively in a first pixel block dividing mode and a second pixel block dividing mode, and integrating pixels in the pixel blocks as a result of division, to obtain a second image and a third image with their resolutions being lower than or equal to the second resolution; and
projecting the second image and the third image alternately.

* * * * *